(12) United States Patent
Ahmad et al.

(10) Patent No.: US 8,699,780 B1
(45) Date of Patent: Apr. 15, 2014

(54) ARABIC BANK CHECK ANALYSIS AND ZONE EXTRACTION METHOD

(71) Applicant: King Fahd University of Petroleum and Minerals, Dhahran (SA)

(72) Inventors: Irfan Ahmad, Dhahran (SA); Sabri Abdullah Mahmoud Mohammed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/891,122

(22) Filed: May 9, 2013

(51) Int. Cl.
*G06K 9/00* (2006.01)
(52) U.S. Cl.
USPC .......................................................... 382/137
(58) Field of Classification Search
None
See application file for complete search history.

(56) References Cited

U.S. PATENT DOCUMENTS

| | | | |
|---|---|---|---|
| 5,097,517 A * | 3/1992 | Holt | 382/137 |
| 5,208,869 A | 5/1993 | Holt | |
| 5,572,601 A * | 11/1996 | Bloomberg | 382/175 |
| 5,572,602 A * | 11/1996 | Naoi et al. | 382/178 |
| 5,633,954 A | 5/1997 | Gupta et al. | |
| 8,150,160 B2 | 4/2012 | Al-Muhtaseb et al. | |
| 8,358,827 B2 * | 1/2013 | Faulkner et al. | 382/137 |
| 2005/0018896 A1 * | 1/2005 | Heit et al. | 382/137 |
| 2005/0238252 A1 * | 10/2005 | Prakash et al. | 382/289 |
| 2006/0045321 A1 * | 3/2006 | Yu | 382/137 |
| 2009/0252437 A1 * | 10/2009 | Li et al. | 382/289 |
| 2012/0274991 A1 * | 11/2012 | Roy et al. | 358/462 |

OTHER PUBLICATIONS

Ahmad I, Mahmoud SA. Arabic bank check processing: State of the art. Journal of Computer Science and Technology 28(2): 285 {299 Mar. 2013. DOI 10.1007/s11390-013-1332-6.

* cited by examiner

*Primary Examiner* — Bhavesh Mehta
*Assistant Examiner* — Feng Niu
(74) *Attorney, Agent, or Firm* — Richard C Litman

(57) ABSTRACT

The Arabic bank check analysis and zone extraction method for courtesy amount, legal amount, and the date fields uses available information and performs adaptive local processing using projections and connected component analysis. The method performs skew correction and connected component analysis on the check image and removes components smaller than average size before identifying the regions using projection profiles. This leads to a highly effective and robust technique. The method is based on prior knowledge of the check zone structure.

2 Claims, 7 Drawing Sheets

ARABIC BANK CHECK ANALYSIS AND ZONE EXTRACTION METHOD

BACKGROUND OF THE INVENTION

1. Field of the Invention

The present invention relates to digital image processing, and particularly to an Arabic bank check analysis and zone extraction method.

2. Description of the Related Art

Page analysis and zone extraction are key areas of research in document image processing and it acts as a bridge between document preprocessing and higher level document understanding, such as logical page analysis and OCR. Bank check processing is an important application of document analysis and recognition. Nearly one hundred billion checks are processed all over the world yearly. Most of the checks are still processed manually by humans. Despite its apparent simplicity, a check is a complex document. It integrates images (check layout), pre-printed components (logos, labels of data-entry fields, etc.), as well as handwritten components (literal amounts, legal amounts, signature, date, issuing place, etc.). These fields do not have fixed positions, and their structure varies according to the countries and institutions. Due to its complexity, check processing is considered as an important research field. Arabic check processing, apart from not being researched as thoroughly as other checks, has its own challenges, and hence is less advanced compared to check processing systems of other languages.

Before recognizing the regions of interest from a check image, it is important that the check image passes through various stages of preprocessing, which mainly involves binarization, skew correction, and extraction of regions of interest from the check image. Researchers of Arabic check processing have adapted some aspects of the preprocessing and check analysis techniques of other languages.

A few researchers addressed Arabic check analysis and zone extraction, and in some cases, it was computer-aided and not fully automated. Known related art methods use mathematical morphology (MM) and Hough transformation (HT) for extracting zones of interest from Arabic checks. A horizontal filter uses a linear structuring element of one-fourth the image width. A vertical filter uses a linear structuring element of one-tenth the image height. The combined result is used to extract a bounding box of the courtesy amount. Two additional filters of an appropriate number of pixels are applied on the check image to extract the legal amount and date fields. This leads to obtaining the connected components in the remaining check image, which are color-labeled. The legal amount is identified as the component having the maximum number of pixels in the same color. The prior knowledge of the position of the legal amount in the checks was utilized. To extract the courtesy amount using the Hough transformation technique, the bounding rectangle is identified. After removing the bounding rectangle of the courtesy amount, the Hough transformation is applied on the remaining image to get the longest printed line representing the line associated with the legal amount. An estimate of the height of the writing script is used to get the legal amount. The date field is identified as the first horizontal line on the top of check image. These two techniques were tested using the 1775 Arabic checks from the CENPARMI database. Extraction rates of 98%, 95%, and 97% for courtesy amount, legal amount, and date, respectively, are reported, using the MM technique. On using the HT technique, extraction rates of 98%, 95%, and 98% for the courtesy amount, legal amount, and date, respectively, are reported. A hybrid approach of MM and HT technique has also been used, wherein broken lines of the HT technique are joined using MM by using a separation threshold of 10 pixels. Using this hybrid technique, researchers reported an extraction rate of 98.27%, 91.82%, and 99.63% for courtesy amount, legal amount and date fields, respectively. Yet there is still room for improvement with respect to successful extraction rates.

Thus, an Arabic bank check analysis and zone extraction method solving the aforementioned problems is desired.

SUMMARY OF THE INVENTION

The Arabic bank check analysis and zone extraction method performs skew correction and connected component analysis on the check image and removes components smaller than average size before identifying the regions using projection profiles. This leads to a highly effective and robust technique. The method is based on the prior knowledge of the check zone structure.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
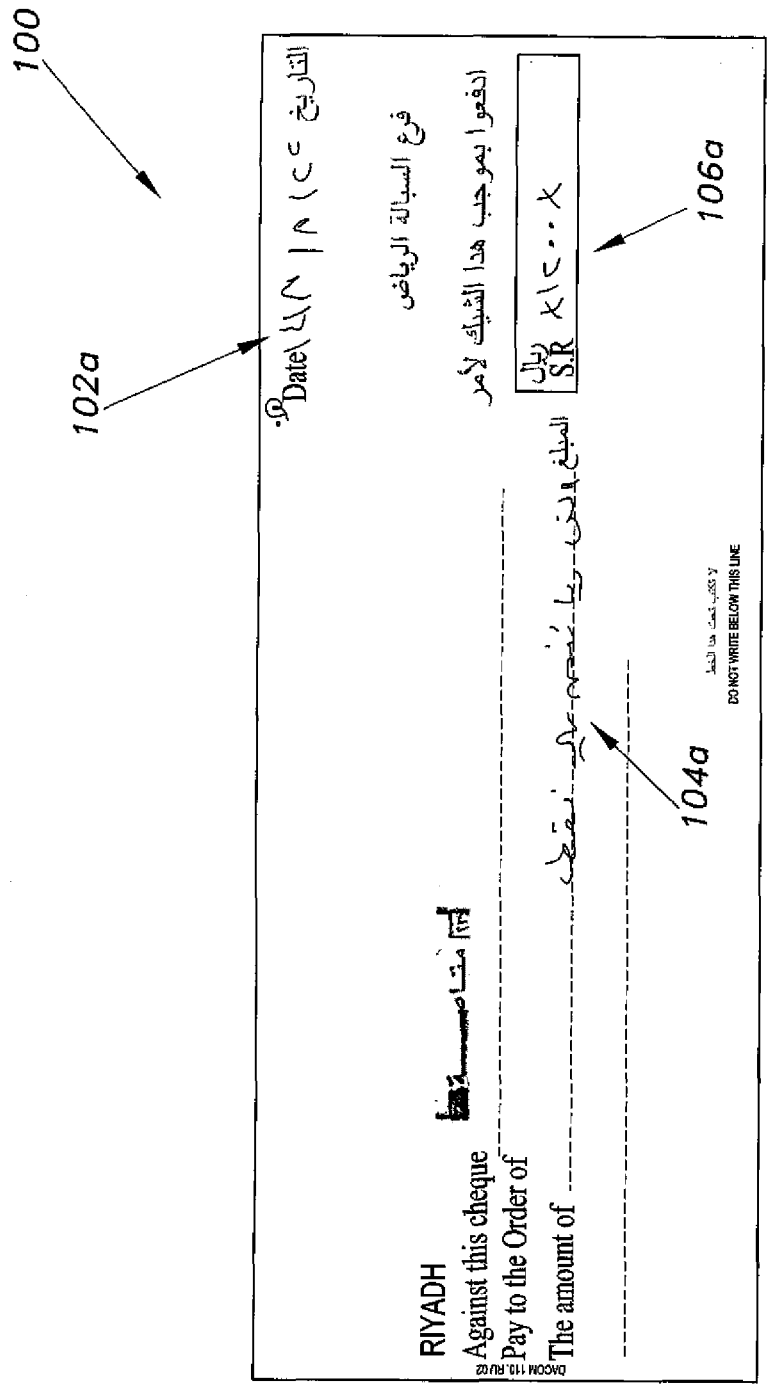
FIG. 1A is a front view of a sample check image to be processed according to the Arabic bank check analysis and zone extraction method according to the present invention.
Figure 1B:
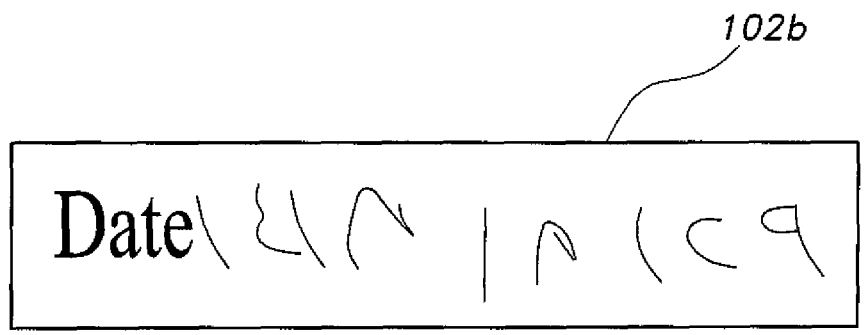
FIG. 1B is a date region extracted from the check of FIG. 1A by the Arabic bank check analysis and zone extraction method according to the present invention.
Figure 1C:
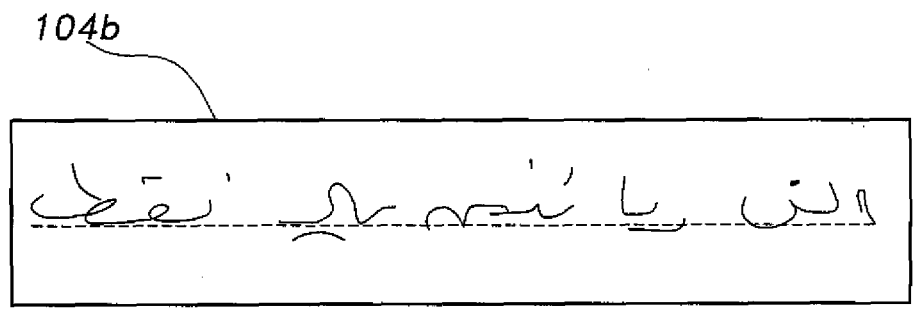
FIG. 1C is a legal amount region extracted from the check of FIG. 1A by the Arabic bank check analysis and zone extraction method according to the present invention.
Figure 1D:
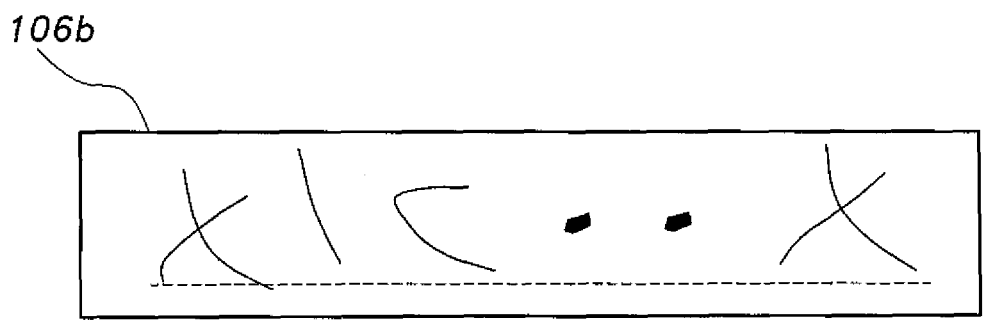
FIG. 1D is a courtesy amount region extracted from the check of FIG. 1A by the Arabic bank check analysis and zone extraction method according to the present invention.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The Arabic bank check analysis and zone extraction method inputs a check image and performs adaptive local processing using projections and connected component analysis to extract three regions of interest from the check image. The three regions of interest include the date, the courtesy and legal amounts. FIGS. 1A-1D show an Arabic check image 100 with a legal amount region 104a, a date region 102a, and a numeric amount region 106a, and the corresponding extracted portions 104b, 102b, and 106b. The present method uses a top-down approach of document segmentation to extract zones of interest from the Arabic checks, as it is a more effective and efficient method if the particulars of a document's layout are known beforehand. The present method implements a rule-based technique for zone extraction, which is explained below.

Before extracting the zones of interests, skew correction is performed on the check image. When a document is fed to the scanner, a few degrees of skew (tilt) is unavoidable. Skew correction is a process that aims at detecting the deviation of the document orientation angle from the horizontal or vertical direction. The dominant orientation of the text lines determines the skew angle.

Prior knowledge of the presence of printed lines in bank checks is used to perform skew correction. To calculate the skew angle, the gray scale image is converted into a binary image to remove the check background. A known thresholding technique is used to separate the background from the foreground. Next, the present method performs horizontal projections of the check image to identify the printed lines. Those regions whose horizontal projection of ink pixels exceeds a certain threshold are identified as possible printed horizontal lines. The problem with projecting the pixels horizontally is that it is not robust, and many non-line components may be aligned that can give a false impression of the presence of lines.

Figure 2A:
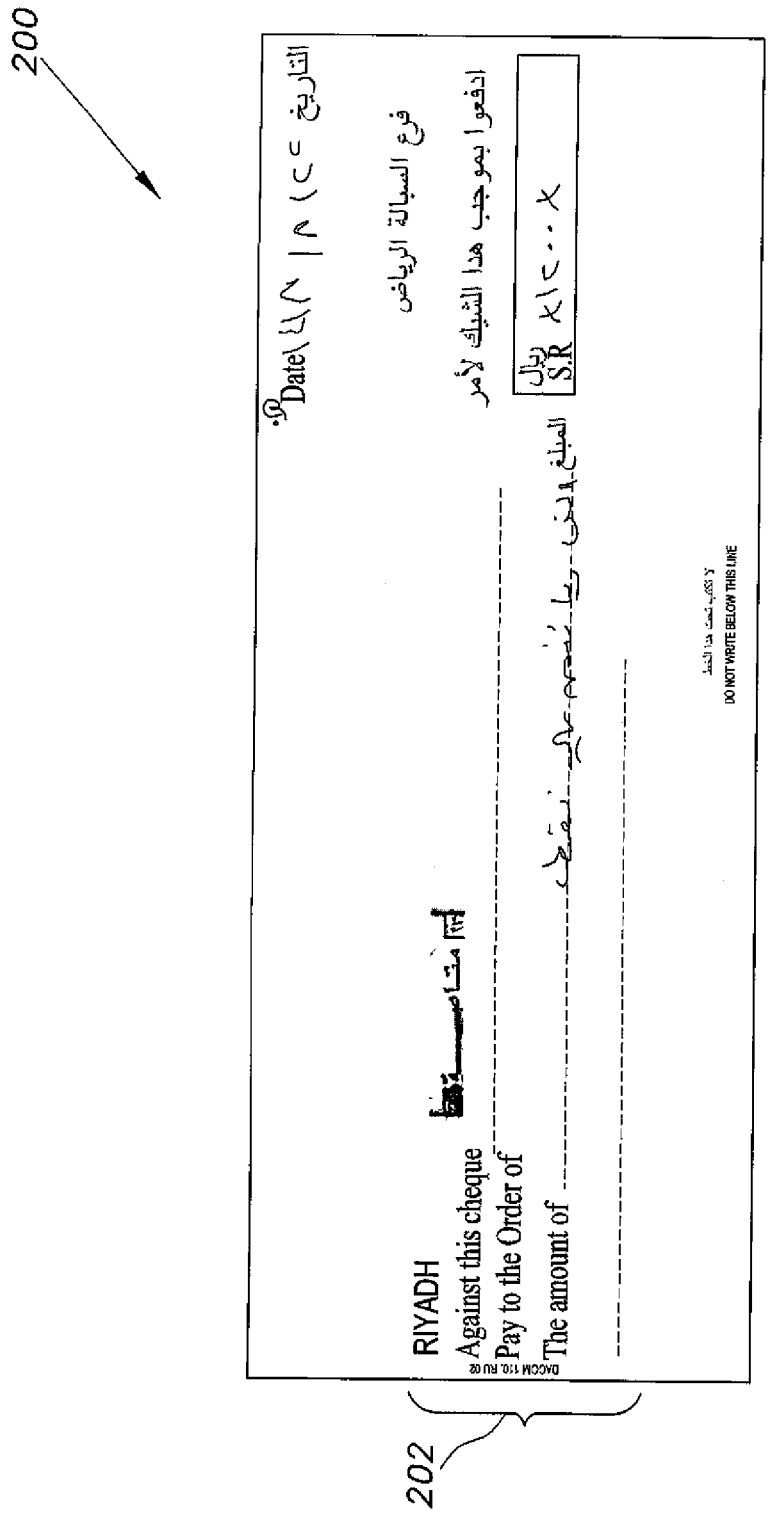
FIG. 2A is a binarized image of the check of FIG. 1A, including small components.
Figure 2B:
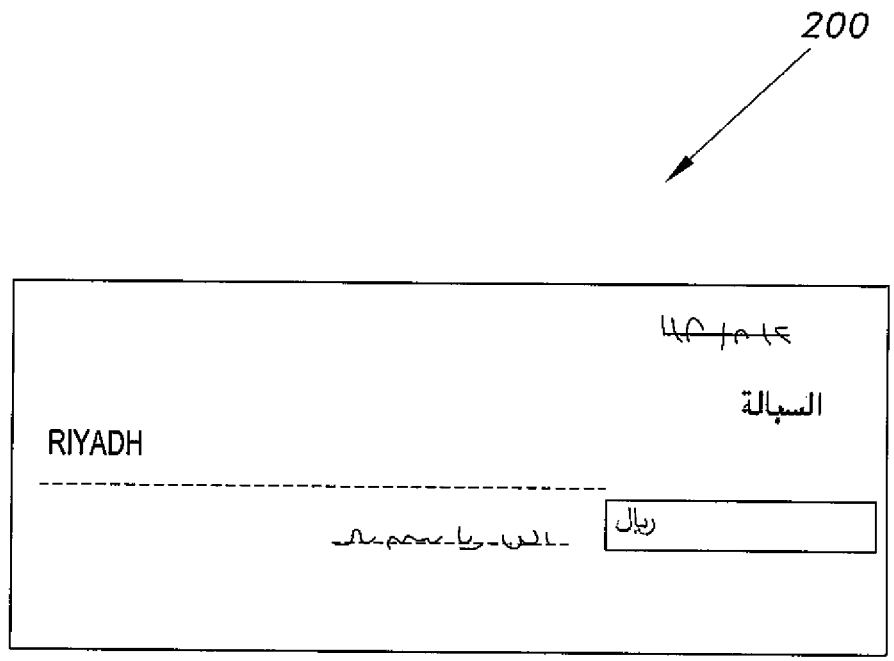
FIG. 2B is a binarized image of the check of FIG. 1A with small components removed.
Figure 3:
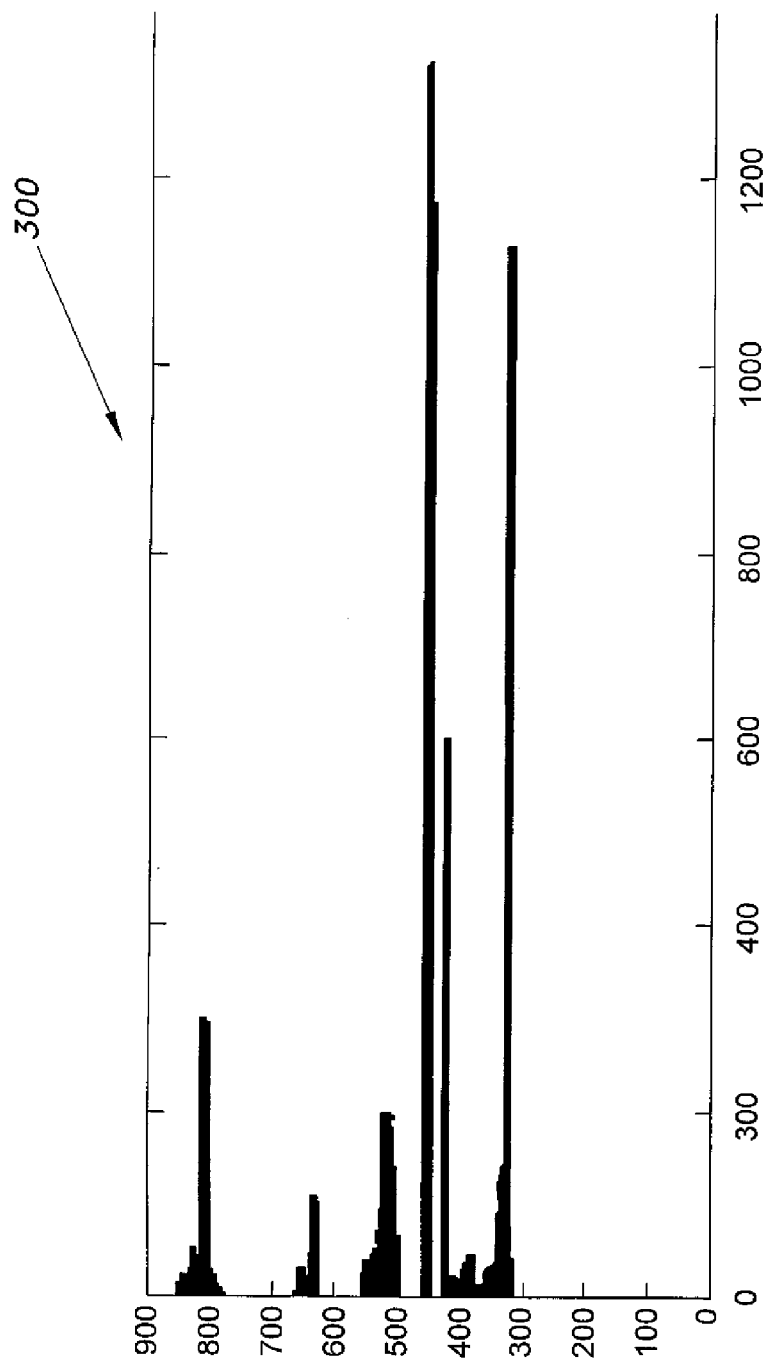
FIG. 3 is a horizontal projection of the binarized check image.
Figure 4A:
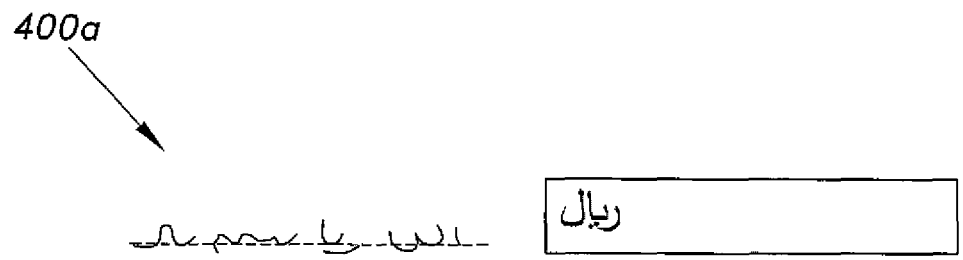
FIG. 4A is the right portion of the check image.
Figure 4B:
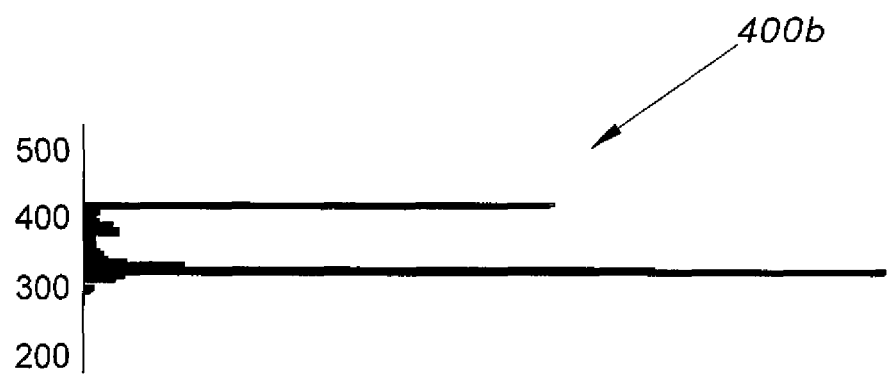
FIG. 4B is a horizontal projection of the right portion of the check image.
Figure 4C:
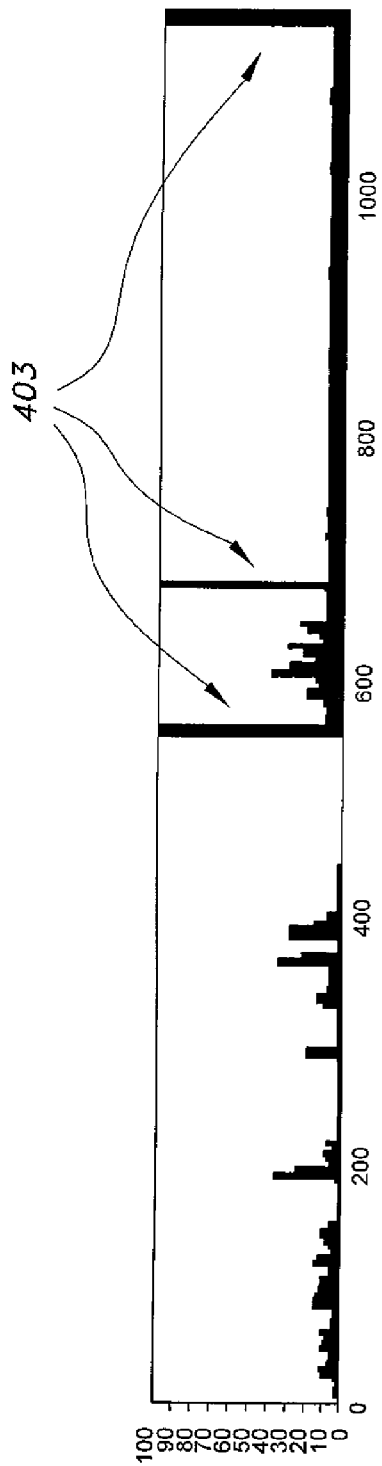
FIG. 4C is a vertical projection within the region between the top and bottom line of the courtesy amount box.
Figure 4D:
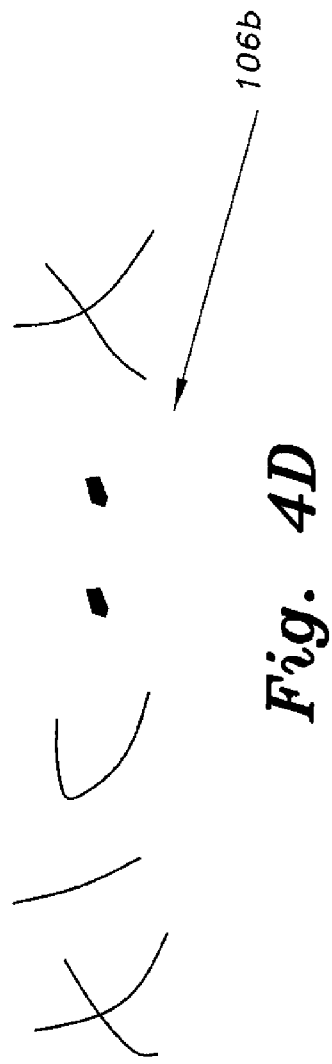
FIG. 4D is the extracted courtesy amount.

To avoid this problem, the present method first performs connected component analysis and removes all the components whose size is less than the average size of all the components in the check image. Performing connected components analysis before horizontal projections makes the technique of the present method highly robust. FIGS. 2A-2B show the check image 200 with small components 202 before processing, and after processing with the small components removed. Plot 300 of FIG. 3 shows the horizontal projections of the image after removing the small components. Once the possible lines are identified, the present method extracts the X-Y coordinates of each line and performs regression to calculate the slope of the line. This is done for all the identified lines, and the skew of the check image is estimated to be the average slope of lines in the check image. Once the skew angle is calculated, the check image is adjusted by performing rotational transformation on it.

Prior knowledge about the position of the date region is used for extracting it from the check image. In the exemplary case, the date region occupies the top-right area of the check image. The present method performs horizontal projections on the binarized check image and identifies the vertical start and end coordinates of the date region. Next, the present method performs vertical projections of this identified region to identify the left and right extremes of the date region. Once all the corners of the date region are obtained, it is extracted from the original gray scale image and then binarized to separate the background from the foreground. This technique of binarizing each extracted region locally (after extracting them) is more effective as compared to binarizing the complete image, as each region may have some specific local properties.

To extract the courtesy amount, the present method performs horizontal projections on the binarized check image (having small components removed) and identifies the top and bottom lines surrounding the courtesy amount region. Having prior knowledge that the courtesy amount is on the right half of the check image makes the search for lines more efficient. Once the present method identifies the top and bottom lines surrounding the courtesy amount, the present method performs vertical projections within this region to identify the left and right lines enclosing the courtesy amount. The courtesy amount is extracted from the original gray-scale image after identifying the positions of the four surrounding lines. As a last step, the courtesy amount is binarized and trimmed to remove empty white regions within the courtesy amount box. FIGS. 4A-4D show the process of courtesy amount extraction graphically, where 400a is the right part of the check image, 400b is a plot of the horizontal projections of the image 400a, 400c is a plot of the vertical projections 403 within the region between the top and bottom line of the courtesy amount box, and 106b is the extracted courtesy amount.

The final step is to extract the legal amount from the check image. Based on prior knowledge of the courtesy amount region, the present method locates the approximate legal amount region and performs horizontal projections to find the top and bottom extremes of the legal amount region. Next, the present method performs vertical projections within this region to locate the left and right extremes of the legal amount. Finally, the present method removes unwanted components from the legal amount using some heuristics, such as inter-component distances. A large gap between a component and the main body of text suggests a noise or unrelated objects. Most of the printed text near the handwritten legal amount gets separated using these heuristics, but some printed text that is too close to handwritten amounts or overlaps with them are still not separable, and can be looked into as a possible future work. Table 1 summarizes the present zone extraction algorithm.

The present zone extraction algorithm was applied to 1775 checks of the CENPARMI Arabic check database. All the steps of the zone extraction algorithm were applied to the check images. The extracted dates, courtesy amounts and the legal amounts were analyzed manually. Additionally evaluation metrics are considered in cases where the algorithm extracts more components than needed. Table 2 summarizes the result of zone extraction. From the table it is evident that the algorithm is very effective in zone extraction from the Arabic check database.

TABLE 1

Algorithm for Zone Extraction from Arabic Check Images

1. Check Skew Correction
   a. Remove all small components using dynamic threshold.
   b. Identify printed lines in the check image
      i. Perform horizontal projection of the image and select projections whose value indicates the presence of lines.
      ii. Combine the projections of step b(i) that are adjacent.
   c. Calculate Skew angle for each printed line
      i. Get lower contour points for each line.
      ii. Perform regression on these points to calculate the slope.

TABLE 1-continued

Algorithm for Zone Extraction from Arabic Check Images d. Find the skew angle for the check image by averaging the slope for all the lines
  e. Rotate the check image to correct the skew
 2. Extraction of Date
  a. Extract the top-right quarter of the check image which includes the date region.
  b. Perform horizontal projections.
  c. If more than one thin horizontal segment exists in that region, merge them together.
  d. Perform vertical projection to locate the left and right extremes of the date field.
  e.
 3. Extraction of Courtesy Amount
  a. Remove all small components based on a dynamic threshold.
  b. Extract the rectangle box of courtesy amount using projection technique
   i. Locate the top and the bottom lines of the rectangle box using horizontal projection.
   ii. Locate the left and right lines of the bounding box by using vertical projection of the image from the top-bottom region.
 4. Extraction of Legal Amount
  a. Based on the prior knowledge from Step 3 of the courtesy region, locate the legal amount region.
  b. Perform horizontal projection to locate the top and bottom extremes of the legal amount region.
  c. Perform vertical projection on the above top-bottom region to locate the left and right extremes of the legal amount.
  d. Remove unwanted components by using following heuristics:
   i. Inter-component distances.
   ii. Vertical position of components.

TABLE 2

Results of Zone Extraction from Arabic Check Images

| Technique | Courtesy Amount | | Legal Amount | | Date | |
|---|---|---|---|---|---|---|
| | Average extraction rate % | Statistical Significance Interval | Average extraction rate % | Statistical Significance Interval | Average extraction rate % | Statistical Significance Interval |
| 1st Related Technique* | 98 | ±0.62 | 95 | ±0.92 | 98 | ±0.62 |
| 2nd Related Technique* | 98.27 | ±0.59 | 91.82 | ±1.13 | 99.63 | ±0.32 |
| Present Method | 99.94[1] 99.55[2] | ±0.21 ±0.35 | 99.94[1] | ±0.21 | 99.83[1] 99.09[2] | ±0.25 ±0.45 |

[1]Including extra components
[2]Excluding extra components
*It is not clear in the Related Techniques whether the extra components are included or excluded.

In the case of the date regions, the algorithm always extracts the date, but in some cases (13 out of 1775) it includes extra components in the date region. There are two reasons for this. First, some checks had some overwriting or date correction by the check writer so that he/she signed over the date region. Thus, the extracted date regions included parts of the signature along with it. This problem will be addressed in future work. Second, some checks had stamps overlapping the date region. These can be removed using some heuristics, such as the height-to-width ratio of the date region. Moreover, it is expected that the automation process for check processing will be used before the stamping of the checks in a real scenario, so the inventors believe that this should not be a big concern. In the case of courtesy amounts, 8 out of 1775 amounts had problems. These problematic check images had missing printed lines of the box enclosing the courtesy amounts (possibly they got removed during the masking process to remove the personal information of the check writers).

Thus, our algorithm was unable to detect the enclosing box. This issue, although not expected in the real scenario, is addressed in our work so that if one of the two lines is present, the algorithm uses heuristics to decide which of the two (top or bottom) lines is absent, and then captures the amount above or below the detected line accordingly. The problems with extracted legal amounts are similar to courtesy amounts.

A confidence level of 95% was used in the evaluation of the present method. This means that the recognition rate is within the given statistical confidence range with a probability of 95%. Since the change in the courtesy and legal amounts average extraction rates are outside the confidence interval, it can be interpreted that the rates are statistically significant. Results for the date field are statistically significant compared with the work in the first related art technique and not statistically significant compared to the work in the second related art technique.

It is to be understood that the present invention is not limited to the embodiments described above, but encompasses any and all embodiments within the scope of the following claims.

We claim:

1. A computer-implemented Arabic bank check analysis and zone extraction method, comprising the steps of:
inputting a check image for digital image processing;
removing, based on a dynamic threshold, selected image components from the check image;
identifying printed lines in the check image by performing horizontal projection of the check image and selecting projections having a value indicating the presence of lines;
combining the projections that indicate adjacent connected components;
obtaining lower contour points for each of the printed lines;
calculating an individual slope for each of the lines, the individual slope calculation using regression on the lower contour points;
averaging a plurality of the individual slope calculations, thereby obtaining an average slope for all the lines;
rotating the check image by an angle defined by the average slope, thereby correcting skew of the check image;
extracting a date region in a top-right quarter of the check image, wherein extracting the date region comprises performing horizontal projections on the top-right quarter of said check image, merging horizontal segments from said date region together, and performing vertical projection to locate left and right extremes of the date region;
extracting a rectangular box of a courtesy amount, wherein extracting the rectangular box comprises locating top and bottom lines of said rectangular box using horizontal projection and locating left and right lines of said rectangular box by using a vertical projection of said image from said top line to said bottom line;
locating a legal amount region;
performing horizontal projection on the legal amount region to locate top and bottom extremes of the legal amount region;
performing vertical projection on a top-bottom region defined by the legal amount region horizontal projection, thereby locating left and right extremes of the legal amount; and
removing unwanted components based on inter-component distances and vertical position of the components.

2. A computer software product, comprising a non-transitory medium readable by a processor, the non-transitory medium having stored thereon a set of instructions for performing an Arabic bank check analysis and zone extraction method, the set of instructions including:
(a) a first sequence of instructions which, when executed by the processor, causes said processor to input a check image for digital image processing;
(b) a second sequence of instructions which, when executed by the processor, causes said processor to remove, based on a dynamic threshold, selected image components from said check image;
(c) a third sequence of instructions which, when executed by the processor, causes said processor to identify printed lines in said check image by performing horizontal projection of said check image, said processor selecting projections whose value indicates the presence of lines;
(d) a fourth sequence of instructions which, when executed by the processor, causes said processor to combine said projections that adjacently indicate connected components;
(e) a fifth sequence of instructions which, when executed by the processor, causes said processor to obtain lower contour points for each said printed line;
(f) a sixth sequence of instructions which, when executed by the processor, causes said processor to calculate an individual slope for each of said lines, said slope calculation using regression on said lower contour points;
(g) a seventh sequence of instructions which, when executed by the processor, causes said processor to average a plurality of said individual slope calculations thereby obtaining an average slope for all said lines;
(h) an eighth sequence of instructions which, when executed by the processor, causes said processor to rotate said check image by an angle of said average slope thereby correcting skew of said check image;
(i) a ninth sequence of instructions which, when executed by the processor, causes said processor to extract a date region in a top-right quarter of said check image, wherein extracting the date region comprises performing horizontal projections on the top-right quarter of said check image, merging horizontal segments from said date region together, and performing vertical projection to locate left and right extremes of the date region;
(j) a tenth sequence of instructions which, when executed by the processor, causes said processor to extract a rectangular box of a courtesy amount, wherein extracting the rectangular box comprises locating top and bottom lines of said rectangular box using horizontal projection and locating left and right lines of said rectangular box by using a vertical projection of said image from said top line to said bottom line;
(k) an eleventh sequence of instructions which, when executed by the processor, causes said processor to locate a legal amount region;
(l) a twelfth sequence of instructions which, when executed by the processor, causes said processor to perform horizontal projection on the legal amount region to locate top and bottom extremes of the legal amount region;
(m) a thirteenth sequence of instructions which, when executed by the processor, causes said processor to perform a vertical projection on top-bottom region defined by said legal amount region horizontal projection thereby locating left and right extremes of said legal amount; and
(n) a fourteenth sequence of instructions which, when executed by the processor, causes said processor to remove unwanted components based on inter-component distances and vertical position of said components.

* * * * *